(12) United States Patent
Shen et al.

(10) Patent No.: US 9,625,627 B2
(45) Date of Patent: Apr. 18, 2017

(54) INCIDENT ANGLE INSENSITIVE COLOR FILTER AND ITS MANUFACTURING METHOD

(71) Applicant: ZHEJIANG UNIVERSITY, Hangzhou, Zhejiang Province (CN)

(72) Inventors: Weidong Shen, Hangzhou (CN); Chenying Yang, Hangzhou (CN); Yueguang Zhang, Hangzhou (CN); Xu Liu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 175 days.

(21) Appl. No.: 14/412,361

(22) PCT Filed: Jan. 2, 2014

(86) PCT No.: PCT/CN2014/070002
§ 371 (c)(1),
(2) Date: Dec. 31, 2014

(87) PCT Pub. No.: WO2015/085655
PCT Pub. Date: Jun. 18, 2015

(65) Prior Publication Data
US 2016/0274282 A1    Sep. 22, 2016

(30) Foreign Application Priority Data

Dec. 13, 2013  (CN) .......................... 2013 1 0689440

(51) Int. Cl.
*G02B 5/18*     (2006.01)
*G02B 27/44*    (2006.01)
(Continued)

(52) U.S. Cl.
CPC .......... *G02B 5/207* (2013.01); *G02B 5/1819* (2013.01); *G02B 5/201* (2013.01); *G02B 1/02* (2013.01)

(58) Field of Classification Search
CPC .... G02B 5/201; G02B 5/1842; G02B 5/1861; G02B 5/1819; G02B 27/0977;
(Continued)

(56) References Cited

U.S. PATENT DOCUMENTS

2009/0284696 A1    11/2009   Cheong et al.

FOREIGN PATENT DOCUMENTS

CN    101178454 A    5/2008
CN    101398496 A    4/2009
(Continued)

*Primary Examiner* — Jade R Chwasz
(74) *Attorney, Agent, or Firm* — Jiwen Chen

(57) ABSTRACT

The belt ply feeder and a feeding method include: when a belt ply is conveyed to the front end of a conveying forming board, a force is exerted by a perpendicular adjustment device to drive a conveying forming board bracket to swing upward and rotate around a pivot shaft of a rack to positions at which the upper surface of the conveying forming board is tangential to the periphery of a belt ply drum. According to this arrangement, the belt ply is tangential to the belt ply drum all the time and a belt ply is in firm contact with a belt ply drum regardless of the size of the belt ply drum when wrapping the belt ply around the belt ply drum. Accordingly, the quality of tire shaping can be improved.

9 Claims, 3 Drawing Sheets

(51) Int. Cl.
*G02B 5/22* (2006.01)
*G02B 5/20* (2006.01)
*G02B 1/02* (2006.01)

(58) Field of Classification Search
CPC . G02B 27/44; G02B 5/20; G02B 5/26; G02B
6/0055; G02F 1/133514; G02F 1/133516;
G03F 7/0007; G03F 7/20; G03F 7/2022;
G03F 7/0002; G03F 7/0005; G03F 7/32
USPC ........ 359/885, 891, 900, 566, 567, 569–576
See application file for complete search history.

(56) References Cited

FOREIGN PATENT DOCUMENTS

| | | |
|---|---|---|
| CN | 102789021 A | 11/2012 |
| JP | 0431819 A | 2/1992 |
| WO | WO2012145677 A2 | 10/2012 |

INCIDENT ANGLE INSENSITIVE COLOR FILTER AND ITS MANUFACTURING METHOD

This is a U.S. national stage application of PCT Application No. PCT/CN2014/070002 under 35 U.S.C. 371, filed Jan. 2, 2014 in Chinese, claiming the priority benefit of Chinese Application No. 201310689440.8, filed Dec. 13, 2013, which is hereby incorporated by reference.

FIELD OF THE INVENTION

The present invention relates to an optical component, particularly to an incident angle insensitive color filter and its manufacturing method which can be applied in the fields of liquid crystal display, color printing, sensor detecting, anti-counterfeiting and so forth.

BACKGROUND OF THE INVENTION

Angle insensitive color filters have significant application prospects in the fields of liquid crystal display, color printing, sensor detecting, anti-counterfeiting and so forth. The traditional chemical dye color filters achieve the filtering effect as the result of a wavelength-selective absorption of the particular functional groups. However, dyes will cause a material instability and a significant environmental burden. The optical thin film filters by multi-layer interference performs well with a high peak transmittance, a tailored bandwidth, and stable specifications. However, they present an obvious blue-shift phenomenon, that is, spectral curves will move to short wavelengths with an increasing angle of incidence, which limits the application at large incidence angles. In recent years, a variety of color filters based on sub-wavelength structures have been proposed owing to the intensive research on the electromagnetic theory of sub-wavelength grating and the development of micro/nano fabricating techniques. The guided mode resonance light filters are able to switch the energy of the incident light between reflection and transmission in a very small range via the coupling between the high-order leaky mode and the waveguide mode in the media of grating, so as to obtain the filters with ultra-narrow band. However, the guided mode resonance filters are very sensitive to the incidence angle. Even though the incident angular tolerance can be improved via structure optimization and other means, it is still very difficult to get higher insensitivity of the incidence angle. By fabricating one-dimensional subwavelength grating of silicon on the quartz substrates, Kanamori et al obtained transmission color filters in the three colors of red, green and blue. But their properties will change with the incidence angle (Fabrication of transmission color filters using silicon subwavelength gratings on quartz substrates, IEEE Photon. Technol. Lett. 18, 2126-2128 (2006)). In addition, researchers also proposed stacked subwavelength grating structure to obtain the color filters with better performance at normal incidence by stacking two layers of one-dimensional or two-dimensional subwavelength gratings. To improve the insensitivity of the incidence angle, Cheong et al proposed the use of silicon with high refractive index as the material of two-dimensional subwavelength grating to realize intense modulated grating and obtain high angular tolerant reflective filters (High angular tolerant color filter using subwavelength grating, Appl. Phys. Lett. 94, 213104-3 (2009)). However, their properties deteriorate at different azimuth angles and are not suitable for practical application. Besides, the electron beam lithography technique is used in the manufacturing process. It is high cost, time-consuming, and difficult to manufacture.

Among the nano-material structures, orderly porous structure periodically arranged is widely studied and applied in numerous research fields. Porous alumina, with pores regularly hexagonally latticed, has attracted more and more researchers to study into thoroughly and widely due to its simple and convenient manufacturing methods. At present, the study of porous alumina concentrates mainly focuses on the material characteristics and the application of the physical structure of the material, such as the producing of the nanotube, the transfer of the porous structure, the observation of quantum dot structure, and so forth.

Atomic layer deposition (ALD) technology is a method of forming a film by alternately feeding gas precursor pulse into the reactor to absorb and have chemical reaction on the deposition substrate. It was proposed by a scientist from Finland in 1970s. With development of the microelectronics and deep submicron chip technology in the middle of 1990s, ALD has been extensively applied in the field of semiconductor. Due to the self-confinement of ALD surface reaction, theoretically, the deposition accuracy of ALD can reach atomic level. Furthermore, compared with the traditional deposition method for an optical film, the film by ALD has incomparable advantages in term of deposition temperature, aggregation density and conformality. So the use of ALD in the preparation of optical films gradually becomes a hot topic in research.

Although research and application based on the combination of porous alumina and atomic layer deposition has been proposed constantly, as far as we know, the research on the manufacturing of incident angle insensitive color filters by using atomic layer deposition to fill the porous alumina with the high refractive index oxides as the template has never been proposed. The manufacturing of incident angle insensitive color filters in the present invention is simple and of low cost. Therefore, the present invention is expected to be extensively applied in the fields of liquid crystal display, color printing, sensor detecting and anti-counterfeiting and so forth.

SUMMARY OF THE INVENTION

The present invention relates to an incident angle insensitive color filter which has a simple structure of two-dimensional grating structure. It is insensitive to the incidence angle, stable and environment friendly.

The present invention also relates to a manufacturing method of such incident angle insensitive color filter. By combining the porous alumina preparation technique and the atomic layer deposition technique together, this method avoids such complicated techniques as electron beam lithography, laser direct writing or nanoimprint. It is simple and suitable for industrial manufacture.

To solve the first technical problem, the present invention provides the following technical solution:

an incident angle insensitive color filter, comprising a substrate made of fused quartz, a plurality of cylindrical gratings made of silicon, arranged in regular hexagon on the substrate.

The use of cylindrical gratings arranged in regular hexagon ensures the insensitivity to the incidence angle of the light filters and the filters in the present invention is suitable for various situations with large incidence angles.

The light filters in the present invention are mainly applied for visible light with wavelength ranging 380-780 nm. For the required central wavelength, the filters of gratings with different dimension can be designed. It is preferred that the gratings as claimed are perpendicular to the substrate; the thickness of the gratings is 70-200 nm; the radius of cylindrical the gratings is 40-90 nm; and the center distance between the cylindrical gratings is 100-280 nm.

To solve the second technical problem, the present invention also provides a manufacturing method of the incident angle insensitive color filters as claimed, comprising the following steps:

(1) obtaining the thickness, the cylindrical radius and the center distance of cylindrical gratings by optimization, corresponding to the central wavelength of the filter to be manufactured; and prior arts can be selected and used in the optimization process;

(2) depositing a layer of silicon on the fused quartz substrate and annealing, wherein the thickness of the silicon layer equals to the thickness of the grating;

(3) preprocessing the aluminum foil;

(4) anodizing the preprocessed aluminum foil twice and obtaining orderly arranged porous alumina, wherein the pore radius equals to the radius of cylindrical gratings and the pore center distance equals to the center distance of cylindrical gratings; in this step, the pore depth shall meet the etching requirements in step (12); and the porous alumina obtained in this step comprises the porous alumina part with porous structure and an aluminum substrate without porous structure;

(5) spin-coating a layer of polymethyl methacrylate on the porous alumina as the protective layer for removing the aluminum substrate;

(6) removing the aluminum substrate in the mixed solution of copper sulfate and hydrochloric acid, clean and obtaining a porous alumina template frame coated with a protective layer;

(7) using oxygen plasma to bombard the silicon layer with fused quartz substrate, and then fixing the porous alumina template frame onto the silicon layer with fused quartz substrate in step (2);

(8) removing the polymethyl methacrylate layer on the porous alumina template frame;

(9) atomic layer depositing oxide on the orderly arranged porous alumina template frame;

(10) using reactive ion etching to remove the oxide layer covered on the surface of porous alumina;

(11) using KOH solution to remove the porous alumina template frame, showing the outline of the required two-dimensional grating which is composed of cylindrical oxide columns orderly arranged in regular hexagon;

(12) using reactive ion etching method to etch on the oxide columns and the silicon layer simultaneously, transferring the two-dimensional grating template to the bottom silicon layer, thus the required two-dimensional grating is made, then using wet etching to remove the residual oxide columns and obtaining an incident angle insensitive color filter wherein the gratings are cylindrical, arranged in regular hexagon and made up of silicon.

In step (2), to make gratings with higher reflectivity, it is preferred that the annealing conditions are follows: rapid annealing under 1000-1100° C. for 15-25 seconds first, then annealing under 550-650° C. for 20-25 hours, and at last annealing under 850-950° C. for 15-25 hours. It is further preferred that the annealing conditions are: rapid annealing under 1050° C. for 20 seconds first, then annealing under 600° C. for 24 hours, and at last annealing under 900° C. for 20 hours.

To obtain regular, cylindrical pore structure, it is preferred that the aluminum foil in step (3) is high purity aluminum foil of 99.999%. If there is too much impurity in the aluminum foil, the obtained cylindrical pore structure might be irregular, which is bad for the subsequent manufacturing of gratings.

The oxides as claimed are titanium dioxide, hafnium dioxide or tantalum pentoxide which are all non-toxic, environment-friendly and can be easily removed in the subsequent steps. It is further preferred that the oxide is titanium dioxide.

To obtain the target grating structure, it is preferred that the reactive ion etching conditions as claimed in step (10) are: the volume flow rate of $CHF_3$ is 50-60 sccm, and the volume flow rate of $O_2$ is 5-10 sccm; and it is further preferred that the volume flow rate of $CHF_3$ is 55 sccm, and the volume flow rate of $O_2$ is 5 sccm.

It is preferred that the reactive ion etching conditions as claimed in step (12) are: the volume flow rate of carbon tetrafluoride is 20-30 sccm, and the volume flow rate of oxygen is 3-6 sccm. After reactive ion etching, transfer the two-dimensional grating to the bottom silicon layer and the upper oxide columns are etched, then remove the residual oxide columns and the required two-dimensional grating structure can be obtained. It is further preferred that the reactive ion etching conditions are: the volume flow rate of carbon tetrafluoride is 25 sccm, and the volume flow rate of oxygen is 3.1 sccm.

Different from the traditional chemical light filters and traditional interference light filters, incident angle insensitive color filters in the present invention are based on two-dimensional grating structure and make use of the huge refractive index contrast in the grating layer, by which the resonance is excited the resonance via the coupling between the regions with high/low refractive index, so as to achieve the incident angle insensitive filtering effects.

Compared with the prior art, the present invention has the following advantages:

(1) Incident angle insensitive color filters in the present invention, based on the porous alumina structure, control the pore size and the thickness of the oxide with high refractive index by atomic layer deposition via simple operations, to make specific two-dimensional gratings and therefore fabricate incident angle insensitive color filters. This method subtly combines the porous alumina preparation and atomic layer deposition technique, and successfully avoids such complicated techniques as electron beam lithography, laser direct writing or nanoimprint, which is suitable for large scale mass manufacturing and thus greatly reduces the cost of the incident angle insensitive color filters.

(2) The manufacturing method of incident angle insensitive color filters in the present invention is simple and of low cost, which is suitable for large scale mass manufacturing. Therefore, the present invention is expected to be extensively applied in the fields of liquid crystal display, color printing, sensor detecting, anti-counterfeiting and so forth.

BRIEF DESCRIPTION OF THE DRAWINGS

FIG. 1b shows the arrangement diagram of gratings of the light filter in FIG. 1a.

DESCRIPTION OF THE PREFERRED EMBODIMENT

Next, the present invention will be further described in details with reference to the drawings.

Figure 1A:
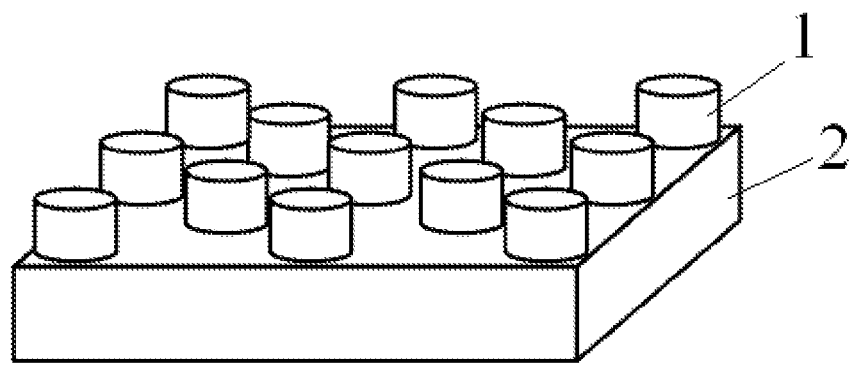
FIG. 1a shows the schematic view of the structure of the incident angle insensitive color filter in the present invention.
Figure 1B:
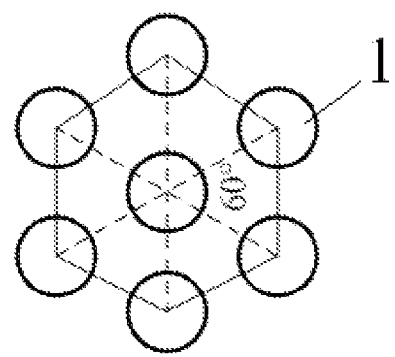

As shown in FIGS. 1a and 1b, an incident angle insensitive color filter comprises a substrate 2 and a single layer of two-dimensional gratings 1 fixed on the substrate 2, wherein the gratings 1 are cylindrical, made of silicon and arranged in a regular hexagon shape on the substrate of fused quartz. Different from the traditional chemical light filters and traditional interference light filters, incident angle insensitive color filters in the present invention are based on two-dimensional grating structure and make use of the huge refractive index contrast in the grating layer, by which the resonance is excited the resonance via the coupling between the regions with high/low refractive index, so as to achieve the incident angle insensitive filtering effects.

Figure 2:
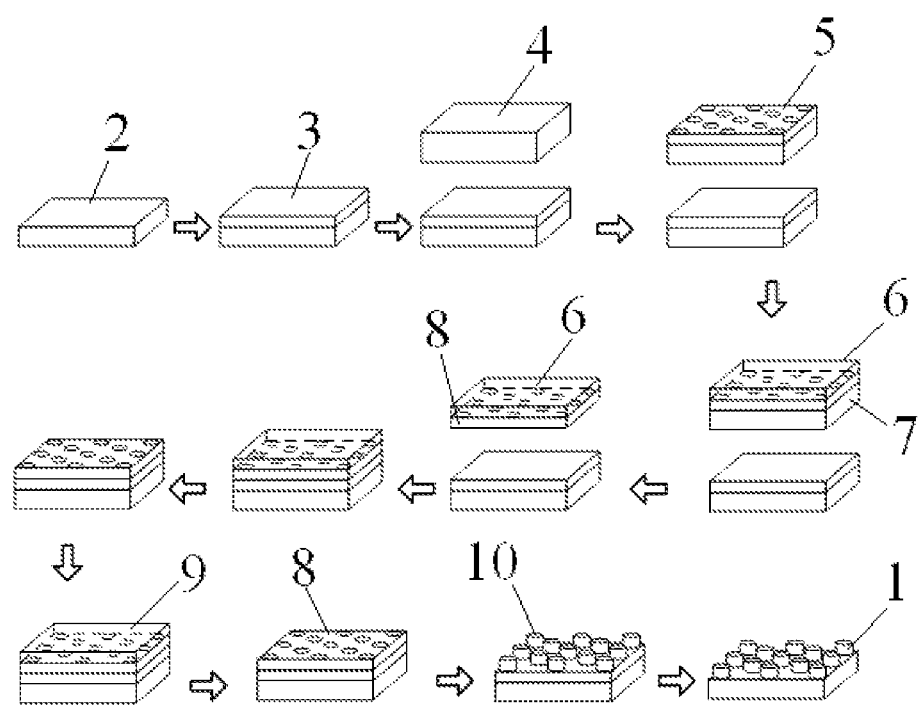
FIG. 2 shows the flow chart for the manufacturing method of the incident angle insensitive color filter in the present invention.

As shown in FIG. 2, a manufacturing method of incident angle insensitive color filters comprises the following steps:

(1) For expected color filters with specific central wavelength, through the optimization of structural parameters, corresponding thickness, cylindrical radius and center distance of cylindrical gratings can be designed, wherein the thickness of the gratings generally is 70-200 nm; the radius of the cylindrical gratings is generally 40-90 nm; and the center distance among the cylindrical gratings is generally 100-280 nm. Please see the references for the optimization process: Chenying Yang, Liang Hong, Weidong Shen, Yueguang Zhang, Xu Liu, and Hongyu Zhen, Design of reflective color filters with high angular tolerance by particle swarm optimization method, Opt. Express 21, 9315-9323 (2013).

(2) Depositing a layer of silicon on the clean fused quartz substrate 2 by electron beam evaporation, form the silicon layer 3, and have rapid annealing under 1050° C. for 20 seconds first, then annealing under 600° C. for 24 hours, and at last annealing under 900° C. for 20 hours. Gratings fabricated under such conditions will have high reflectance, wherein the deposition thickness equals to the thickness of the grating;

(3) Degrease the high-purity aluminum foil 4 (99.999%) in acetone and ethyl alcohol, wash it in water, and then electropolish it in the mixed solution of $H_4ClO_4$ and absolute ethyl alcohol (1:3) under 16~18V at 10° C. for 3 minutes. Then, wash the polished aluminum foil with deionized water.

(4) First anodization: using 0.3 mol/L oxalic acid solution as the electrolyte, controlling the oxidation electrode voltage kept at 40V, oxidizing for 10 hours and washing with deionized water; secondary anodization: soaking in the mixed solution of 6% $H_3PO_4$ and 1.5% $H_2CrO_4$ (mass ratio) to remove the oxide layer generated in the first anodization and washing with deionized water. Then, putting it into 0.3 mol/L oxalic acid solution again with the oxidation time determined based on the required pore depth. Since the oxidation time is directly related to the pore depth, their relation can generally be determined via several tests. These operations are prior arts and the actual oxidation time shall be determined based on the results of several tests. And controlling the oxidation electrode voltage can change the pore diameter of the porous alumina and the oxidation electrode voltage is directly related to the pore diameter of the anodic alumina. Their relation can generally be determined via several tests. These operations are prior arts and the actual oxidation time shall be determined based on the results of several tests. After oxidation, washing it with deionized water and porous alumina 5 orderly arranged at subwavelength level can be obtained, wherein the pore radius equals to the radius of cylindrical gratings and the center distance of pores equals to the center distance of cylindrical gratings. The porous alumina 5 comprises the porous alumina part with porous structure and an aluminum substrate without porous structure.

(5) Spin-coating a layer of polymethyl methacrylate 6 on the porous alumina part with porous structure of the porous alumina 5, specifically, 700 r/s spin coating for 9 seconds, 3000 r/s spin coating for 30 seconds and drying under 90° C. for 30 minutes, as the protective layer for removing the aluminum substrate 7;

(6) Soaking in the mixed solution of 0.1 mol copper sulfate and (mass ratio) 10% hydrochloric acid (volume of the hydrochloric acid shall make sure the porous alumina 5 immersed) for 30-40 minutes, remove the aluminum substrate, clean and obtain the porous alumina template frame 8 coated with a protective layer;

(7) Using oxygen plasma to bombard the substrate ($O_2$ flow rate: 80 sccm, pressure: 80 mTorr, and power: 150 W), and then put the porous alumina onto the silicon layer 3 with fused quartz substrate in step (2) for bonding under the action of Van der Waals force;

(8) Conducting treatment with ultraviolet light and ozone under 200° C. for 30 minutes, then washing with acetone and deionized water, and then removing the top polymethyl methacrylate;

(9) Atomic layer depositing the oxide layer 9 with high refractive index on the orderly arranged porous alumina template frame 8, wherein the deposition thickness is equal to or greater than the radius of cylindrical gratings. The filled oxide with high refractive index by atomic layer deposition is titanium dioxide ($TiO_2$), or may be hafnium dioxide or tantalum pentoxide as required. These solvents are non-toxic and can be easily removed. Putting the prepared porous alumina template frame 8 into the atomic layer deposition device and using titanium tetrachloride ($TiCl_4$) and $H_2O$ as the precursor for preparing titanium dioxide ($TiO_2$). During the reaction process, the temperature of the precursor is kept constant at 20° C., the temperature of the porous alumina substrate is 120° C., and the vacuum degree of the reaction chamber is 3 mbar. The pulsing time of titanium tetrachloride ($TiCl_4$) and $H_2O$ is both 400 ms and the purging time is both 5 seconds. The deposition thickness can be controlled via the number of cycles.

(10) Using reactive ion etching ($CHF_3$ volume flow rate: 55 sccm, and $O_2$ volume flow rate: 5 sccm) to remove the oxide layer 9 with high refractive index covered on the porous alumina surface;

(11) Soaking in 1 mol KOH solution for 15 minutes to remove the porous alumina 8 and the outline of the required two-dimensional gratings (oxide columns 10) appears, which are cylindrical, arranged in regular hexagon and made up of oxides with high refractive index;

(12) Using reactive ion etching ($CF_4$ volume flow rate: 25 sccm, and $O_2$ volume flow rate: 3.1 sccm) on the oxide columns 10 and the silicon layer 3 simultaneously, transferring the two-dimensional grating to the bottom silicon layer, then using wet etching to remove the residual oxide columns, thus the required two-dimensional grating 1 is made, and obtaining an incident angle insensitive color filter, wherein gratings 1 are cylindrical, arranged in regular hexagon and made of silicon.

Figure 3:
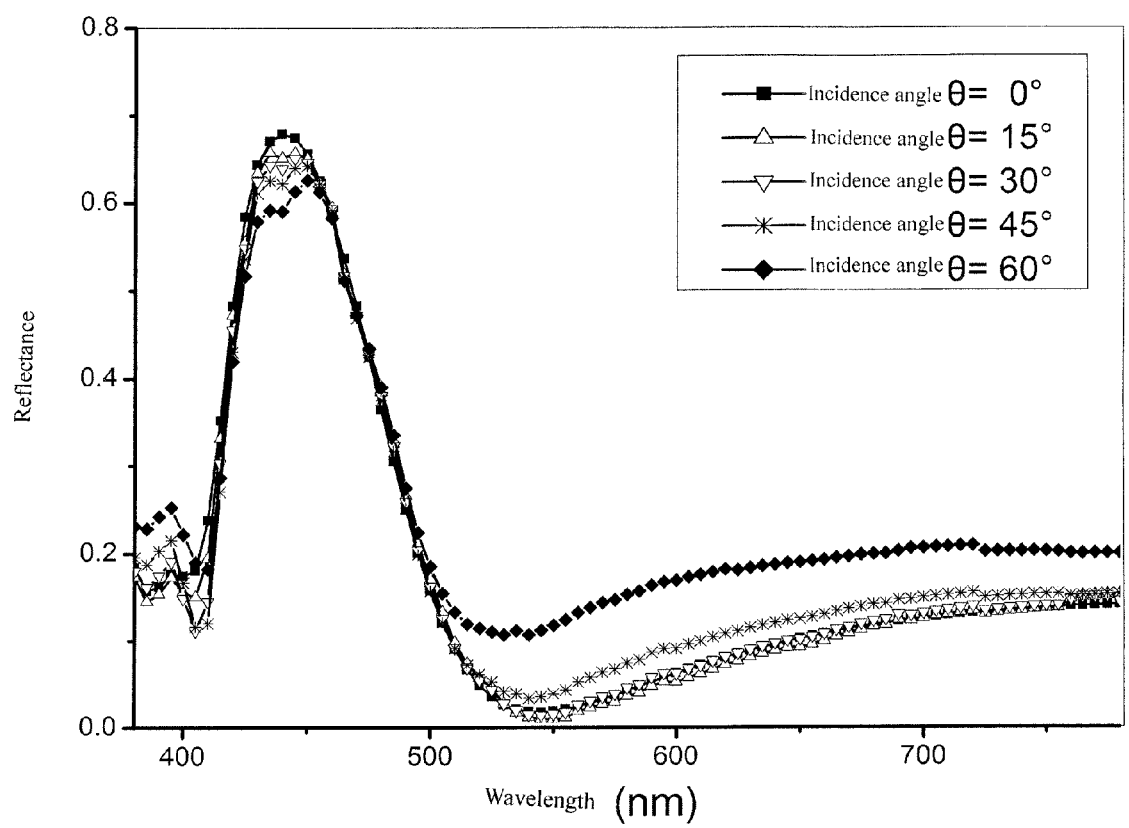
FIG. 3 shows the reflection spectrum chart of the blue light filter designed in the present invention.

Taking the following incident angle insensitive color filter as an example, for a blue filter with expected central wavelength λ=440 nm, its corresponding thickness of the silicon grating is 91 nm; the cylindrical radius of the grating is 48 nm; the center distance of the cylindrical grating is 119 nm; the pore radius of the porous alumina is 48 nm; the pore center distance is 119 nm; the thickness of the oxides with high refractive index by atomic layer deposition is 48 nm; and the cycle of atomic layer deposition is 805. The specific method is same with the manufacturing method of incident angle insensitive color filters in the specific embodiment. The reflection spectrum tests of obtained incident angle insensitive color filters is carried out at incidence angle of 0°, 15°, 30°, 45° and 60° respectively with the test results as shown in FIG. 3. According to FIG. 3, filters in the present invention are insensitive to the incidence angle.

The invention claimed is:

1. A manufacturing method of an incident angle insensitive color filter comprising a substrate, wherein several cylindrical gratings, made of silicon, are arranged in a regular hexagon shape on the substrate which is made of fused quartz; the manufacturing method comprising following steps:
   (1) obtaining thickness, cylindrical radius and center distance of cylindrical gratings corresponding to central wavelength of the filter to be fabricated;
   (2) depositing a layer of silicon on the fused quartz substrate and anneal, wherein the thickness of the silicon layer equals to the thickness of the grating;
   (3) preprocessing an aluminum foil;
   (4) anodizing the preprocessed aluminum foil twice and obtaining orderly arranged porous alumina, wherein the pore radius equals to the cylindrical radius of gratings and the pore center distance equals to the center distance of cylindrical gratings;
   (5) spin-coating a layer of polymethyl methacrylate on the porous alumina as the protective layer for removing the aluminum substrate;
   (6) removing the aluminum substrate in the mixed solution of copper sulfate and hydrochloric acid, cleaning and obtaining a porous alumina template frame coated with a protective layer;
   (7) using oxygen plasma to bombard the silicon layer with fused quartz substrate, and then fixing the porous alumina template frame onto the silicon layer with fused quartz substrate in step (2);
   (8) removing the polymethyl methacrylate layer on the porous alumina template frame;
   (9) atomic layer depositing oxide on the orderly arranged porous alumina template frame;
   (10) using reactive ion etching to remove the oxide layer covered on the surface of porous alumina;
   (11) using KOH solution to remove the porous alumina template frame, showing the outline of the required two-dimensional grating which is composed of cylindrical oxide columns orderly arranged in a regular hexagon shape;
   (12) using reactive ion etching to etch the oxide columns and the silicon layer simultaneously, transferring the two-dimensional grating template to the bottom silicon layer, thus the required two-dimensional grating is made, then using wet etching to remove the residual oxide columns and obtain an incident angle insensitive color filter, wherein the gratings are cylindrical, arranged in regular hexagon and made up of silicon.

2. The manufacturing method of the incident angle insensitive color filter as claimed in claim 1, wherein the annealing conditions in step (2) are: rapid annealing under 1000-1100° C. for 15-25 seconds first, then annealing under 550-650° C. for 20-25 hours, and at last annealing under 850-950° C. for 15-25 hours.

3. The manufacturing method of the incident angle insensitive color filter as claimed in claim 2, wherein the annealing conditions in step (2) are: rapid annealing under 1050° C. for 20 seconds first, then annealing under 600° C. for 24 hours, and at last annealing under 900° C. for 20 hours.

4. The manufacturing method of the incident angle insensitive color filter as claimed in claim 1, wherein the aluminum foil in step (3) is high purity aluminum foil of 99.999%.

5. The manufacturing method of the incident angle insensitive color filter as claimed in claim 1, wherein the oxides are titanium dioxide, hafnium dioxide or tantalum pentoxide.

6. The manufacturing method of the incident angle insensitive color filter as claimed in claim 5, wherein the oxides are titanium dioxide.

7. The manufacturing method of the incident angle insensitive color filter as claimed in claim 1, wherein the reactive ion etching conditions in step (12) are: the volume flow rate of carbon tetrafluoride is 20-30 sccm, and the volume flow rate of oxygen is 3-6 sccm.

8. The manufacturing method of the incident angle insensitive color filter as claimed in claim 7, wherein the reactive ion etching conditions are: the volume flow rate of carbon tetrafluoride is 25 sccm, and the volume flow rate of oxygen is 3.1 sccm.

9. A manufacturing method of an incident angle insensitive color filter comprising a substrate, wherein several cylindrical gratings, made of silicon, are arranged in a regular hexagon shape on the substrate which is made of fused quartz, and wherein the gratings are perpendicular to the substrate, the thickness of the gratings is 70-200 nm, the cylindrical radius of the gratings is 40-90 nm, and the center distance between the cylindrical gratings is 100-280 nm; the manufacturing method comprising the following steps:
   (1) obtaining thickness, cylindrical radius and center distance of cylindrical gratings corresponding to central wavelength of the filter to be fabricated;
   (2) depositing a layer of silicon on the fused quartz substrate and anneal, wherein the thickness of the silicon layer equals to the thickness of the grating;
   (3) preprocessing an aluminum foil;
   (4) anodizing the preprocessed aluminum foil twice and obtaining orderly arranged porous alumina, wherein the pore radius equals to the cylindrical radius of gratings and the pore center distance equals to the center distance of cylindrical gratings;
   (5) spin-coating a layer of polymethyl methacrylate on the porous alumina as the protective layer for removing the aluminum substrate;
   (6) removing the aluminum substrate in the mixed solution of copper sulfate and hydrochloric acid, cleaning and obtaining a porous alumina template frame coated with a protective layer;
   (7) using oxygen plasma to bombard the silicon layer with fused quartz substrate, and then fixing the porous alumina template frame onto the silicon layer with fused quartz substrate in step (2);
   (8) removing the polymethyl methacrylate layer on the porous alumina template frame;
   (9) atomic layer depositing oxide on the orderly arranged porous alumina template frame;
   (10) using reactive ion etching to remove the oxide layer covered on the surface of porous alumina;

(11) using KOH solution to remove the porous alumina template frame, showing the outline of the required two-dimensional grating which is composed of cylindrical oxide columns orderly arranged in a regular hexagon shape;
(12) using reactive ion etching to etch the oxide columns and the silicon layer simultaneously, transferring the two-dimensional grating template to the bottom silicon layer, thus the required two-dimensional grating is made, then using wet etching to remove the residual oxide columns and obtain an incident angle insensitive color filter, wherein the gratings are cylindrical, arranged in regular hexagon and made up of silicon.

* * * * *